US009533774B1

(12) United States Patent
Turner

(10) Patent No.: US 9,533,774 B1
(45) Date of Patent: Jan. 3, 2017

(54) HIGHLY INCLINED ELLIPTICAL ORBIT LAUNCH AND ORBIT ACQUISITION TECHNIQUES

(71) Applicant: Space Systems/Loral, LLC, Palo Alto, CA (US)

(72) Inventor: Andrew E. Turner, Mountain View, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 0 days.

(21) Appl. No.: 15/166,033

(22) Filed: May 26, 2016

Related U.S. Application Data

(63) Continuation of application No. 14/300,027, filed on Jun. 9, 2014, now Pat. No. 9,365,299.

(51) Int. Cl.
*B64G 1/24* (2006.01)
*B64G 1/00* (2006.01)
*B64G 1/10* (2006.01)

(52) U.S. Cl.
CPC .............. *B64G 1/242* (2013.01); *B64G 1/007* (2013.01); *B64G 1/10* (2013.01); *B64G 1/1007* (2013.01)

(58) Field of Classification Search
CPC .......... B64G 1/242; B64G 1/10; B64G 1/002; B64G 1/26
See application file for complete search history.

(56) References Cited

U.S. PATENT DOCUMENTS

| 5,326,054 A * | 7/1994 | Turner | B64G 1/242 244/158.4 |
| 5,507,454 A * | 4/1996 | Dulck | H04B 7/195 244/158.5 |
| 5,687,084 A * | 11/1997 | Wertz | B64G 1/24 244/164 |
| 7,720,604 B1 * | 5/2010 | Cichan | G05D 1/0883 244/158.4 |
| 9,365,299 B2 | 6/2016 | Turner | |

(Continued)

FOREIGN PATENT DOCUMENTS

| WO | WO 03/061141 | 7/2003 |
| WO | WO 2012/040828 | 4/2012 |

OTHER PUBLICATIONS

Office Action dated Jul. 31, 2015 in U.S. Appl. No. 14/300,027.
(Continued)

*Primary Examiner* — Valentina Xavier
(74) *Attorney, Agent, or Firm* — Weaver Austin Villeneuve & Sampson LLP

(57) ABSTRACT

Techniques for placing a satellite into a highly inclined elliptical operational orbit (HIEO) having an argument of perigee of 90° or 270° include executing an orbit transfer strategy that transfers the satellite from a launch vehicle deployment orbit to the operational orbit. The launch vehicle deployment orbit is selected to have an argument of perigee of approximately 90° greater than the argument of perigee of the operational orbit, and to be substantially lower than the operational orbit. The orbit transfer strategy includes (i) an apsidal rotation of approximately 90°, at least a substantial part of the apsidal rotation being attained without expenditure of any satellite propellant; and (ii) an electric orbit raising maneuver to attain an apogee altitude and a perigee altitude required by the HIEO.

20 Claims, 6 Drawing Sheets

(56) References Cited

U.S. PATENT DOCUMENTS

| | | | | |
|---|---|---|---|---|
| 2002/0177403 A1* | 11/2002 | LaPrade | ................ | H04B 7/195 |
| | | | | 455/12.1 |
| 2004/0211864 A1* | 10/2004 | Less | ....................... | H04B 7/195 |
| | | | | 244/158.4 |
| 2012/0119034 A1* | 5/2012 | Kemper | ................. | B64G 1/242 |
| | | | | 244/158.5 |
| 2014/0017992 A1 | 1/2014 | Bigras et al. | | |

OTHER PUBLICATIONS

Notice of Allowance dated Feb. 17, 2016 in U.S. Appl. No. 14/300,027.

Riishojgaard, "Report on Molniya Orbits", World Meteorological Organization, Commission for Basic Systems, Expert Team on Observational Data Requirements and Redesign of the Global Observing System, Seventh Session, Geneva, Switzerland, Jul. 12-16, 2004, 4 pages.

Riishojgaard, "The Case for Launching a Meteorological Imager in a Molniya Orbit", Global Modeling and Assimilation Office, 8 pages.

* cited by examiner

HIGHLY INCLINED ELLIPTICAL ORBIT LAUNCH AND ORBIT ACQUISITION TECHNIQUES

CROSS REFERENCE TO RELATED APPLICATION

This disclosure claims priority to U.S. patent application Ser. No. 14/300,027, filed Jun. 9, 2014, entitled "HIGHLY INCLINED ELLIPTICAL ORBIT LAUNCH AND ORBIT ACQUISITION TECHNIQUES," and assigned to the assignee hereof, the disclosure of which is incorporated by reference in its entirety into this Patent Application.

TECHNICAL FIELD

This invention relates generally to spacecraft and, in particular, to techniques for placing a satellite into a highly inclined elliptical orbit.

BACKGROUND

The assignee of the present invention manufactures and deploys spacecraft for, commercial, defense and scientific missions. Many such spacecraft operate in a geosynchronous orbit having a period equal to one sidereal day (approximately 23.93 hours).

A particular type of geosynchronous orbit is a geostationary orbit (GSO), characterized as being substantially circular and co-planar with the Earth's equator. The nominal altitude (the "GEO altitude) of a GSO is approximately 35,786 km. An elevation angle from a user located on the Earth to a satellite in GSO is a function of the user's latitude. When a service area on the ground intended to receive communications or broadcast services (hereinafter, an "intended service area") is at a north or south latitude above approximately 60 to 70 degrees, the elevation angle is small enough that service quality is significantly impaired.

To mitigate this problem, satellites operable in highly inclined, highly elliptical geosynchronous orbits have been proposed, as described, for example in Bigras, et al., US Pat. Pub. 2014/0017992 (hereinafter, Bigras) the disclosure of which is hereby incorporated in its entirety into the present patent application. A geosynchronous, highly inclined, elliptical orbit (HIEO) may be selected such that the orbit's apogee is located at a pre-selected, substantially constant, longitude and latitude. A satellite operating in an HIEO can, during much of its orbital period (e.g., sixteen hours out of twenty four) enable higher elevation angles to a user than a GSO satellite. Two such satellites co-located in substantially identical orbits, but separated in phase by 180 degrees can provide continuous coverage to an intended circumpolar intended service area above 60 degrees latitude. The altitude of apogee of the HIEO disclosed by Bigras is approximately 48,000 km, whereas the altitude of perigee is approximately 23,000 km. Where the intended service area is in the northern hemisphere, the argument of perigee (the angle in the orbital plane measured, in the direction of satellite motion, from the orbit's ascending node to the orbit perigee) for such an orbit is desirably about 270 degrees. With an argument of perigee of 270 degrees, the orbit apogee is located above the northern hemisphere and the orbit perigee is located above the southern hemisphere. Where the intended service area is in the southern hemisphere, the argument of perigee is desirably about 90 degrees. With an argument of perigee of 90 degrees, the orbit apogee is located above the southern hemisphere and the orbit perigee is located above the northern hemisphere.

In the absence of the presently disclosed techniques, a launch vehicle with a restartable upper stage may inject the satellite directly into the geosynchronous HIEO. The mass that a Proton launch vehicle can deliver from the Baikonur launch complex to the geosynchronous HIEO is about 3500 kg, which is roughly equivalent to the beginning of life mass of a single satellite with typical lifetime and payload characteristics. Thus, using conventional techniques, two launches, each launch being dedicated to a single satellite, would be required to provide continuous coverage to the intended circumpolar service area.

Considering the high cost of a launch vehicle, improved techniques increasing an effective payload capacity of the launch vehicle are desirable.

SUMMARY

The present inventor has appreciated that a geosynchronous HIEO having an apogee above a selected circumpolar service area of the Earth, may be efficiently reached from a launch vehicle deployment orbit having an apogee altitude of approximately 14,000 km and a perigee altitude of approximately 500 km. In a first implementation, where the intended service area is in the northern hemisphere, the launch vehicle deployment orbit is selected to have an argument of perigee of approximately 360°. The disclosed techniques take advantage of a naturally occurring apsidal rotation that results in a rotation of the argument of perigee from 360° to 270° without a necessity to expend satellite propellant. An electric orbit raising maneuver is executed to attain the operational HIEO apogee altitude and perigee altitude.

In a second implementation, where the intended service area is in the southern hemisphere, the launch vehicle deployment orbit is selected to have an argument of perigee of approximately 180°. The disclosed techniques take advantage of a naturally occurring apsidal rotation that results in a rotation of the argument of perigee from 180° to 90° without a necessity to expend satellite propellant. An electric orbit raising maneuver is executed to attain the operational HIEO apogee altitude and perigee altitude.

In some implementations, at least one satellite is placed into an operational orbit by executing an orbit transfer strategy that transfers the satellite from a launch vehicle deployment orbit to the operational orbit. The operational orbit is substantially geosynchronous and has (i) an inclination of greater than 70 degrees; (ii) a nominal eccentricity in the range of 0.25 to 0.5; (iii) an argument of perigee of approximately 90 or approximately 270 degrees; (iv) an operational orbit apogee altitude of approximately 48,000 km; and (v) an operational orbit perigee altitude of approximately 23,000 km. The launch vehicle deployment orbit has an apogee altitude of approximately 14000 km, a perigee altitude of approximately 500 km, and an argument of perigee of approximately 90° greater than the argument of perigee of the operational orbit. The orbit transfer strategy includes: (i) an apsidal rotation of approximately 90° from the argument of perigee of the launch vehicle deployment orbit to the argument of perigee of the operational orbit, at least a substantial part of the apsidal rotation being attained without expenditure of any satellite propellant; and (ii) an orbit raising maneuver to attain the operational apogee altitude and the operational orbit perigee altitude, at least a substantial part of the orbit raising maneuver being performed with electric thrusters.

In some implementations, the at least one satellite may include two or more satellites, each of the two or more satellites being disposed, by a single launch vehicle, into the launch vehicle deployment orbit.

In some implementations, the launch vehicle deployment orbit may be reached by performing at least two orbit transfer maneuvers with an upper stage of a launch vehicle. The at least two orbit transfer maneuvers may include a first maneuver that achieves an initial transfer orbit by firing a thruster of the upper stage proximate to the ascending node of an approximately circular parking orbit. The at least two orbit transfer maneuvers may include a second maneuver that achieves the launch vehicle deployment orbit by firing a thruster of the upper stage proximate to the descending node of the initial transfer orbit. The parking orbit may have an inclination of less than 72° and the launch vehicle deployment orbit may have an inclination of approximately 90°.

In some implementations, the apogee altitude of the launch vehicle deployment orbit may be greater than 12,000 km and less than 16,000 km.

In some implementations, the perigee altitude of the launch vehicle deployment orbit may be greater than 300 km and less than 1000 km.

In some implementations, the apogee altitude of the operational orbit may be greater than 43,000 km and less than 53,000 km.

In some implementations, the perigee altitude of the operational orbit may be greater than 18,000 km and less than 28,000 km.

In some implementations, the argument of perigee of the launch vehicle deployment orbit may be 60° to 120° greater than the argument of perigee of the operational orbit.

In some implementations, a satellite includes a propulsion subsystem and a spacecraft controller. The spacecraft controller is configured to: execute an orbit transfer strategy that transfers the satellite from a launch vehicle deployment orbit to the operational orbit. The operational orbit is substantially geosynchronous and has (i) an inclination of greater than 75 degrees; (ii) a nominal eccentricity in the range of 0.25 to 0.5; (iii) an argument of perigee of approximately 90 degrees or approximately 270 degrees; (iv) an operational orbit apogee altitude of approximately 48,000 km; and (v) an operational orbit perigee altitude of approximately 23,000 km. The launch vehicle deployment orbit has an apogee altitude of approximately 14000 km, a perigee altitude of approximately 500 km, a first inclination with respect to the equator of less than 75 degrees, and an argument of perigee of approximately 90° greater than the argument of perigee of the operational orbit. The orbit transfer strategy includes: (i) an apsidal rotation of approximately 90° such that the argument of perigee rotates from the argument of perigee of the launch vehicle deployment orbit to the argument of perigee of the operational orbit, at least a substantial part of the apsidal rotation being attained without expenditure of any satellite propellant; and (ii) performing, with the propulsion subsystem, an orbit raising maneuver to attain the operational apogee altitude and the operational orbit perigee altitude, at least a substantial part of the orbit raising maneuver being performed with electric thrusters.

In some implementations, the at least one satellite may include two or more satellites, each of the two or more satellites being disposed, by a single launch vehicle, into the launch deployment orbit.

In some implementations, the launch vehicle deployment orbit may be reached by performing at least two orbit transfer maneuvers with an upper stage of a launch vehicle.

In some implementations, the at least two orbit transfer maneuvers may include a first maneuver that achieves an initial transfer orbit by firing a thruster of the upper stage proximate to the ascending node of an approximately circular parking orbit having a first inclination angle with respect to the equator.

In some implementations, the at least two orbit transfer maneuvers may include a second maneuver that achieves the launch vehicle deployment orbit by firing a thruster of the upper stage proximate to the descending node of the initial transfer orbit so as to attain the perigee altitude of approximately 500 km and to attain the operational orbit inclination.

In some implementations, the at least two orbit transfer maneuvers may include a first maneuver that achieves an initial transfer orbit by firing a thruster of the upper stage proximate to the descending node of an approximately circular parking orbit having a first inclination angle with respect to the equator.

In some implementations, the at least two orbit transfer maneuvers may include a second maneuver that achieves the launch vehicle deployment orbit by firing a thruster of the upper stage proximate to the ascending node of the initial transfer orbit so as to attain the perigee altitude of approximately 500 km and to attain the operational orbit inclination.

In some implementations, the parking orbit may have an inclination of less than 72° and the launch vehicle deployment orbit and the operational orbit may have an inclination of approximately 90°.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

Figure 1:
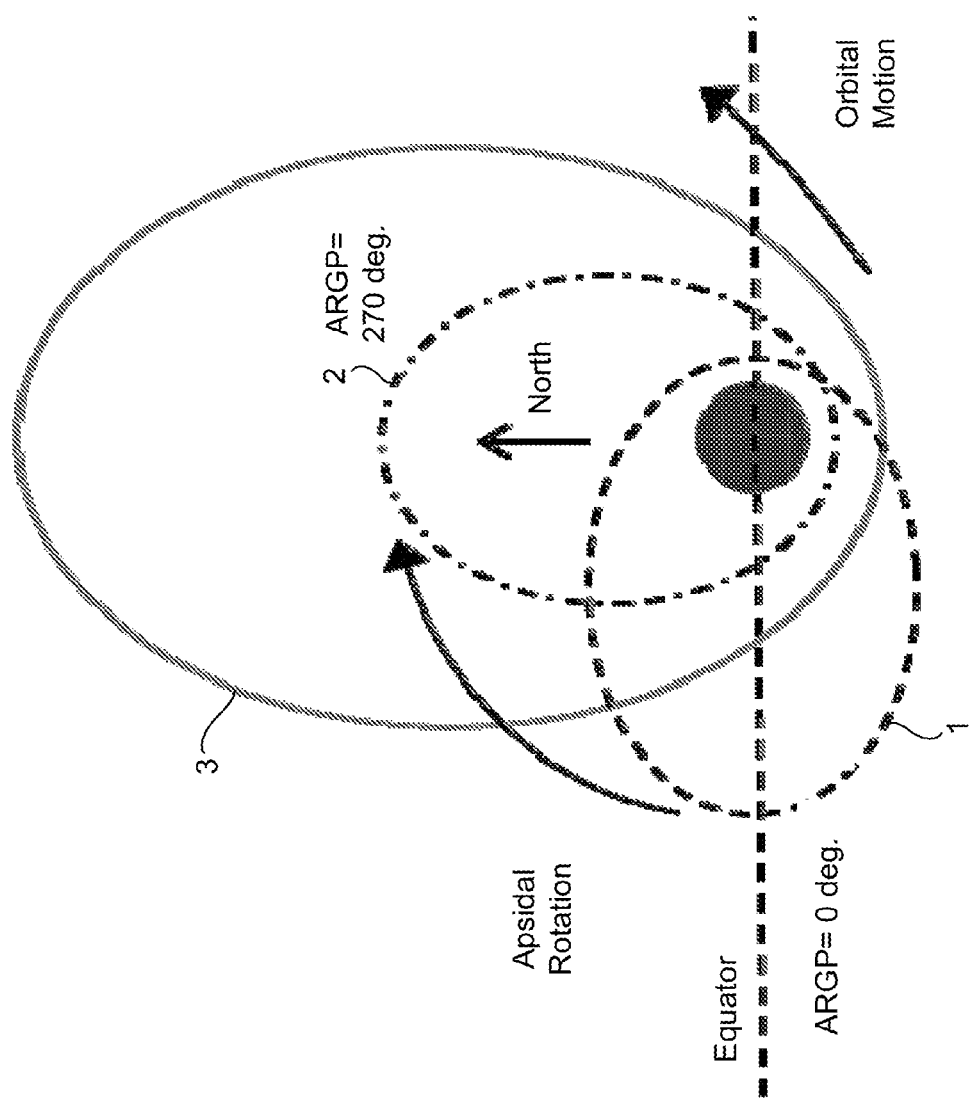
FIG. 1 illustrates an example of HIEO acquisition according to an implementation.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

The terms "spacecraft", "satellite" and "vehicle" may be used interchangeably herein, and generally refer to any orbiting satellite or spacecraft system.

The present disclosure relates to launch and orbit acquisition techniques beneficial for a satellite intended to operate from a geosynchronous orbit that has a moderate to high eccentricity (from about 0.25 to 0.35) and a nearly polar inclination (80-90 degrees). Such an operational orbit is referred to herein as a geosynchronous HIEO and may have an intended service area in a northern circumpolar region (latitude higher than about 60 degrees north latitude) or the southern circumpolar region (latitude higher than about 60 degrees south latitude).

To attain the geosynchronous HIEO, a launch vehicle first carries the satellite to a parking orbit, typically a near-circular orbit having an altitude of about 200 km. Since the operational orbit is to be highly inclined, the parking orbit may be chosen to also be inclined. For example, when launching from Baikonur, a parking orbit inclination as high as 71.6 degrees may be specified.

According to the presently disclosed techniques, after achieving the parking orbit, an upper stage of the launch vehicle may be started (or restarted) to perform a first maneuver that achieves an initial transfer orbit by firing a thruster of the upper stage. In an implementation, the first maneuver may be such that the satellite is accelerated in the orbital direction, with the result that an apogee of the initial transfer orbit has an altitude of approximately 14000 (+/− 2000) km. The resulting orbit may have approximately the same inclination as the parking orbit or one that is modified by up to approximately 5 degrees.

In some implementations, where the intended service area in the northern circumpolar region, the first maneuver may be performed proximate to the ascending node of the parking orbit such that the resulting orbit has an argument of perigee of 0 (360) degrees. It will be appreciated that the first maneuver may include multiple thruster firings performed separately at multiple ascending node crossings.

When the desired apogee altitude has been achieved, the upper stage of the launch vehicle may be restarted to perform a second maneuver, proximate to apogee of the initial transfer orbit. It will be understood that the orbit apogee and the orbit's descending node, are at least approximately co-located. In an implementation, the second maneuver may be such that the satellite is accelerated in the direction of orbital motion, with the result that orbit perigee is raised to about 500 km altitude. The second maneuver may simultaneously accomplish at least most of an orbit inclination change from the parking orbit inclination to an HIEO inclination of approximately 90 degrees. In some implementations, the first maneuver may accomplish a small fraction of this inclination change with the majority of it performed in the second maneuver, because inclination correction is more efficiently accomplished by a maneuver performed near apogee (i.e., as part of the second maneuver). It will be appreciated that the second maneuver may include multiple thruster firings performed separately at multiple descending node crossings. The satellite and upper stage may be separated following completion of the second maneuver.

Referring now to FIG. 1, the resulting Orbit 1 (which may be referred to as the launch vehicle deployment orbit) has an argument of perigee of 0 (360) degrees, and may be located in the desired operational orbital plane. The above-identified values of perigee altitude of 500 km and apogee altitude of 14,000 km have been determined by the present inventor to have certain desirable characteristics. For example, an apogee altitude within the range of 12,000 to 16,000 km has been found to be sufficiently low that apsidal rotation occurs within a reasonable period of time and yet sufficiently high that electric orbit-raising to HIEO may also occur within a reasonable period of time. With respect to the perigee altitude of 500 km, an altitude much below that value may result in undue atmospheric drag on the satellite.

The argument of perigee and altitudes of both apogee and perigee of Orbit 1 are substantially different from the ultimate desired operational orbit (Orbit 3). The present inventor has appreciated that a satellite in Orbit 1 may be efficiently transferred to Orbit 3 in the following manner. First, in order to arrive at the desired argument of perigee of 270°, apsidal rotation of about 90° in the direction indicated in FIG. 1 is required. In some implementations, at least a substantial part of the required apsidal rotation may be attained without expenditure of onboard propellants. More particularly, natural rotation of the orbit's argument of perigee, caused by the Earth's oblateness (the Earth's equatorial radius being approximately 21 km greater than its polar radius) is exploited in order to avoid a need to expend onboard propellants in order to achieve the required apsidal rotation. According to some implementations of the presently disclosed techniques, where the parameters of Orbit 1 initially include an apogee altitude of approximately 14,000 km and a perigee altitude of approximately 500 km, 90° of apsidal rotation has been determined to require approximately 4 to 5 months.

As a result of the above-identified apsidal rotation, the satellite is disposed in an orbit which has the desired argument of perigee of 270°. The satellite may then perform orbit raising using, in some implementations, low thrust, high specific impulse electric thrusters. The electric orbit raising may be tailored to achieve Orbit 3, which may have a perigee altitude of approximately 23,000 km and an apogee altitude of approximately 48,000 km.

Figure 2:
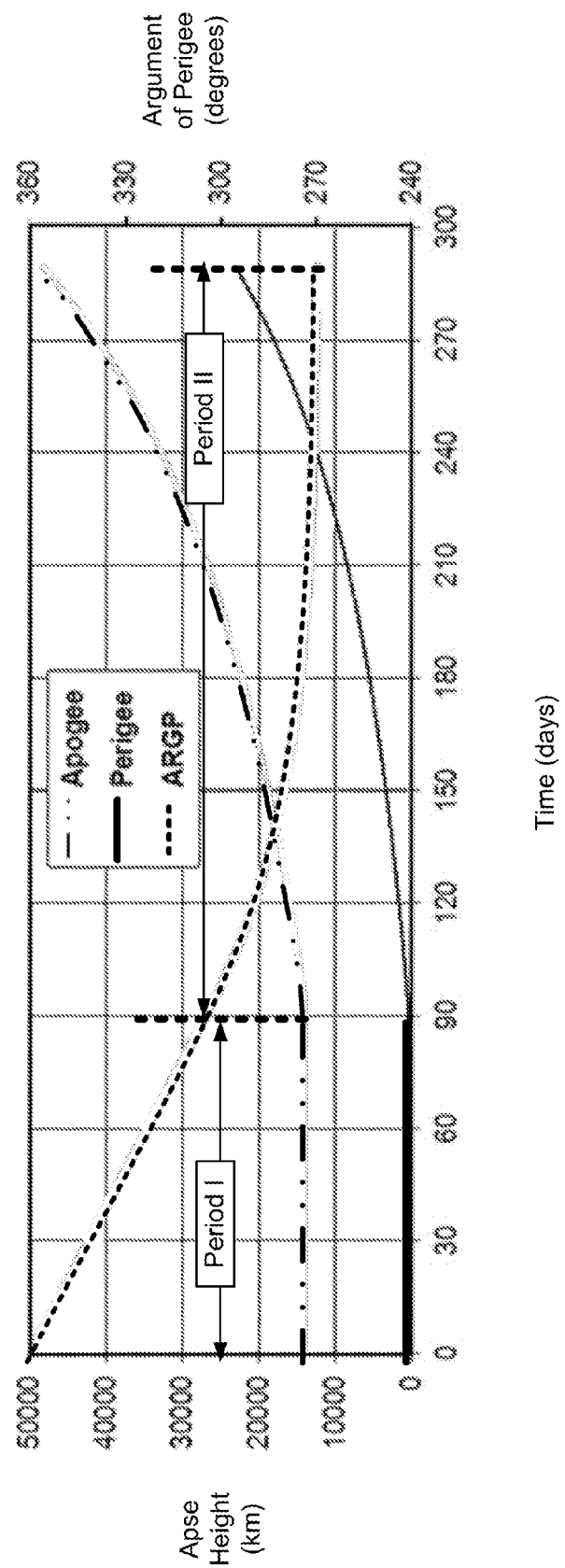
FIG. 2 illustrates an example simulation of orbital parameters as a function of time according to an implementation.

For clarity of illustration, FIG. 1 depicts Orbit 2 as resulting from apsidal rotation without any orbit-raising maneuvers being performed. However, a more time efficient strategy may be contemplated that, as illustrated in FIG. 2, carries out at least some electric orbit-raising prior to the argument of perigee reaching 270°. According to the illustrated simulation, electric orbit-raising may begin after approximately 90 days ("Period I") of apsidal rotation, by which time the argument of perigee will have rotated from 360° to approximately 300°. During a subsequent 6 to 7 months ("Period II"), orbit-raising may be carried out while the argument of perigee continues to rotate. The rate of apsidal rotation will naturally slow as the apogee and perigee of the orbit are raised. According to some implementations, the desired argument of perigee of 270° is achieved at approximately the same time that the desired orbit apogee altitude and perigee altitude have been achieved.

In some implementations, where the intended service area in the southern circumpolar region, the first maneuver may be performed proximate to the descending node of the parking orbit such that the resulting orbit has an argument of perigee of 180 degrees. It will be appreciated that the first maneuver may include multiple thruster firings performed separately at multiple ascending node crossings.

When the desired apogee altitude has been achieved, the upper stage of the launch vehicle may be restarted to perform a second maneuver, proximate to apogee of the initial transfer orbit. It will be understood that the orbit apogee and the orbit's ascending node, are at least approximately co-located. In an implementation, the second maneuver may be such that the satellite is accelerated in the direction of orbital motion, with the result that orbit perigee is raised to about 500 km altitude. The second maneuver may simultaneously accomplish at least most of an orbit inclination change from the parking orbit inclination to an HIEO inclination of approximately 90 degrees. In some implementations, the first maneuver may accomplish a small fraction of this inclination change with the majority of it performed in the second maneuver, because inclination correction is more efficiently accomplished by a maneuver performed near apogee (i.e., as part of the second maneuver). It will be appreciated that the second maneuver may include multiple thruster firings performed separately at multiple descending node crossings. The satellite and upper stage may be separated following completion of the second maneuver.

Figure 3:
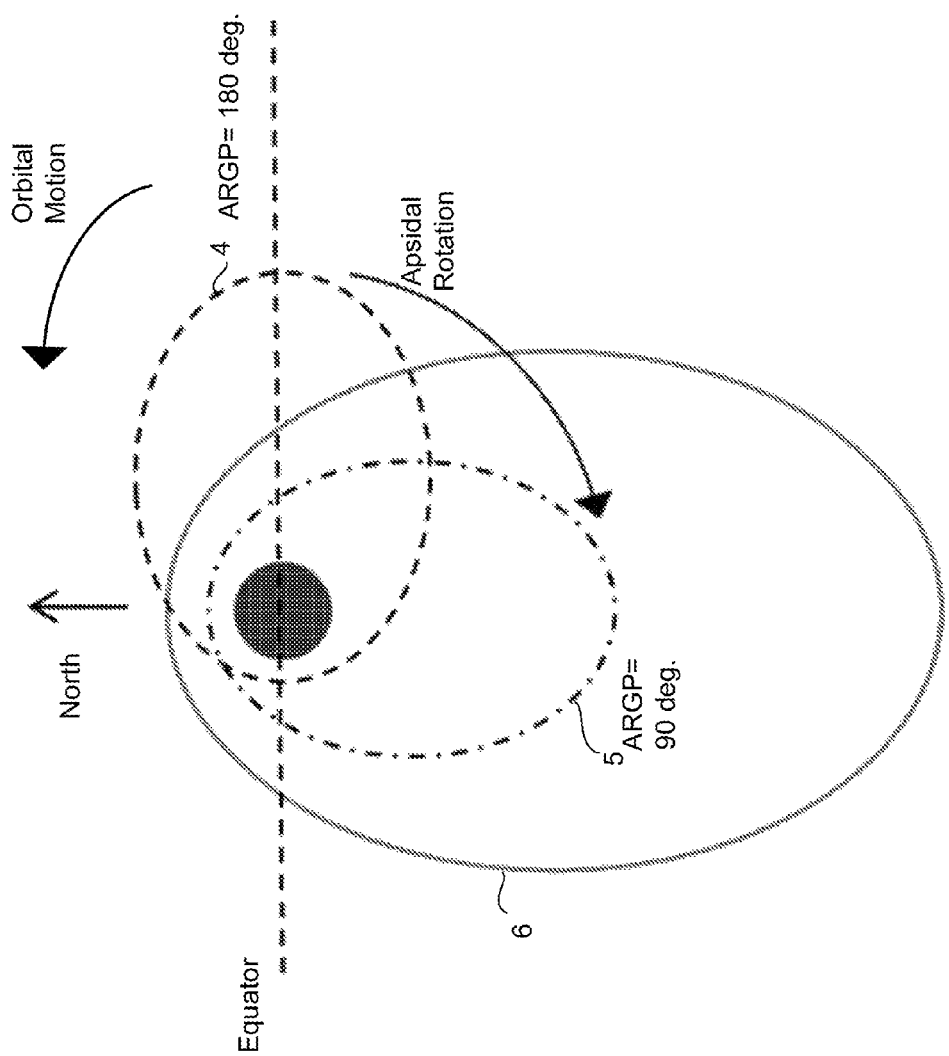
FIG. 3 illustrates an example of HIEO acquisition according to an implementation.

Referring now to FIG. 3, the resulting Orbit 4 (which may be referred to as the launch vehicle deployment orbit) has an argument of perigee of 180 degrees, and may be located in the desired operational orbital plane.

The argument of perigee and altitudes of both apogee and perigee of Orbit 4 are substantially different from the ultimate desired operational orbit (Orbit 6). The present inventor has appreciated that a satellite in Orbit 4 may be efficiently transferred to Orbit 6 in the following manner. First, in order to arrive at the desired argument of perigee of 90°, apsidal rotation of about 90° in the direction indicated in FIG. 3 is required. In some implementations, at least a substantial part of the required apsidal rotation may be attained without expenditure of onboard propellants. More particularly, natural rotation of the orbit's argument of perigee, caused by the Earth's oblateness is exploited in order to avoid a need to expend onboard propellants in order to achieve the required apsidal rotation. According to some implementations of the presently disclosed techniques, where the parameters of Orbit 4 initially include an apogee altitude of approximately 14,000 km and a perigee altitude of approximately 500 km, 90° of apsidal rotation has been determined to require approximately 4 to 5 months.

As a result of the above-identified apsidal rotation, the satellite is disposed in an orbit which has the desired argument of perigee of 90°. The satellite may then perform orbit raising using, in some implementations, low thrust, high specific impulse electric thrusters. The electric orbit raising may be tailored to achieve Orbit 6, which may have a perigee altitude of approximately 23,000 km and an apogee altitude of approximately 48,000 km.

Figure 4:
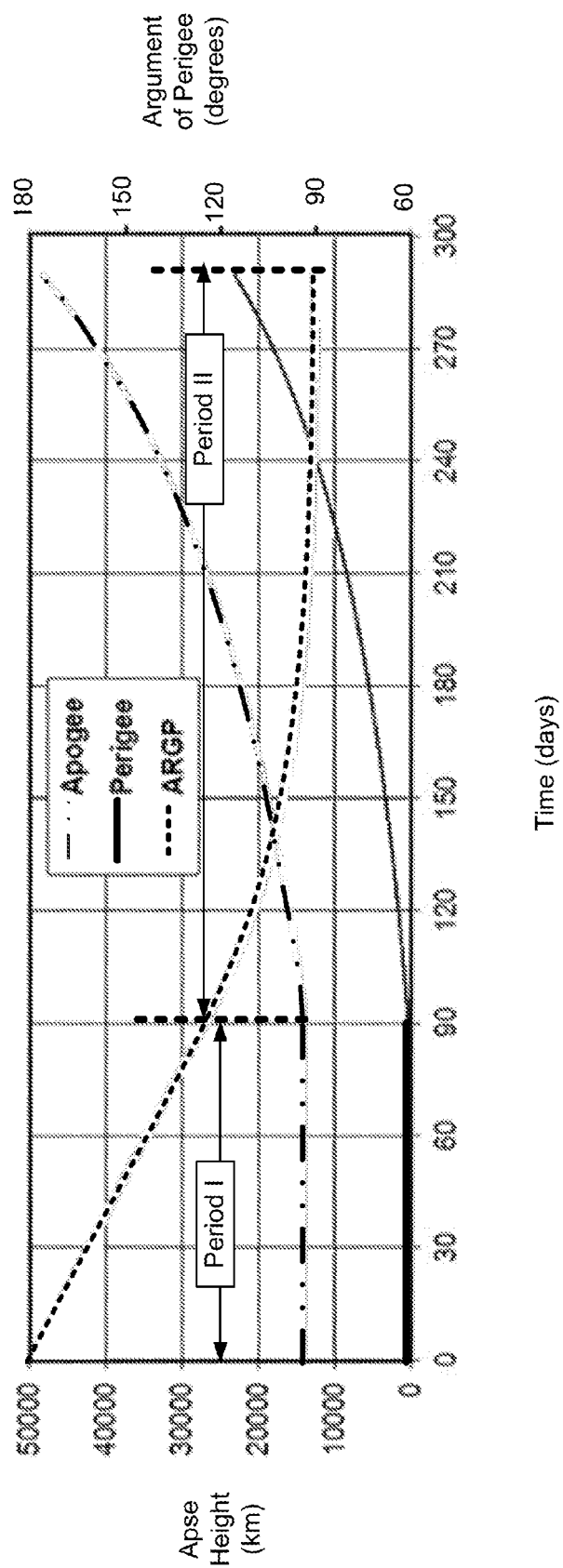
FIG. 4 illustrates an example simulation of orbital parameters as a function of time according to an implementation.

For clarity of illustration, FIG. 3 depicts Orbit 5 as resulting from apsidal rotation without any orbit-raising maneuvers being performed. However, a more time efficient strategy may be contemplated that, as illustrated in FIG. 4, carries out at least some electric orbit-raising prior to the argument of perigee reaching 90°. According to the illustrated simulation, electric orbit-raising may begin after approximately 90 days ("Period I") of apsidal rotation, by which time the argument of perigee will have rotated from 180° to approximately 120°. During a subsequent 6 to 7 months ("Period II"), orbit-raising may be carried out while the argument of perigee continues to rotate. The rate of apsidal rotation will naturally slow as the apogee and perigee of the orbit are raised. According to some implementations, the desired argument of perigee of 90° is achieved at approximately the same time that the desired orbit apogee altitude and perigee altitude have been achieved.

The presently disclosed techniques enable a substantial improvement in payload delivery capability of a given launch vehicle. For example, referring to the above-mentioned case of a Proton launch vehicle launched from the Baikonur launch complex, it was noted that the spacecraft beginning of life (BOL) mass at a geosynchronous HIEO is limited to about 3500 kg, in the absence of the present teachings. As illustrated in the following table, using the presently disclosed techniques with the same launch vehicle, two 3500 kg BOL mass satellites may acquire the geosynchronous HIEO, after having been simultaneously launched by the Proton launch vehicle. As a result, launch costs may be effectively reduced by nearly 50%.

| | Disclosed Technique | Direct Inject by Launch Vehicle to Operational Orbit |
|---|---|---|
| Separated Mass of Spacecraft (kg) | 8080 | 3500 |
| Approximate orbit parameters | Perigee altitude: 500 km Apogee altitude: 14000 km Inclination: 90 degrees ARGP: 360 degrees | Perigee altitude: 23,100 km Apogee altitude: 48,400 km Inclination: 90 degrees ARGP: 270 degrees |
| Mass of Spacecraft at BOL (kg) | 7000 | 3500 |
| Approximate orbit parameters | Perigee altitude: 23100 km Apogee altitude: 48400 km Inclination: 90 degrees ARGP: 270 degrees | Perigee altitude: 23100 km Apogee altitude: 48400 km Inclination: 90 degrees ARGP: 270 degrees |

Figure 5:
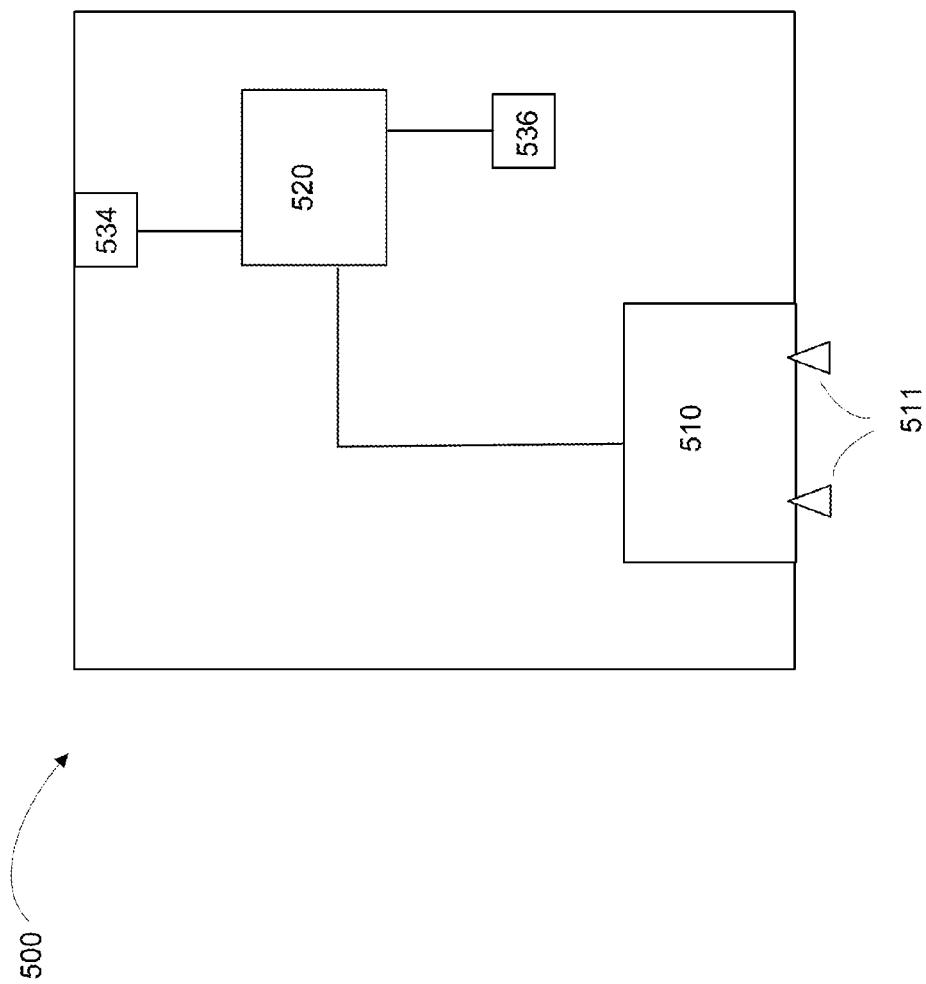
FIG. 5 illustrates an example block diagram of a spacecraft according to some implementations.

Referring now to FIG. 5, an example block diagram of a spacecraft 500 according to an embodiment is illustrated. Spacecraft 500 may include propulsion subsystem 510 and spacecraft controller 520. In an embodiment, for example, propulsion subsystem 510 may include propulsion equipment, such as tankage and control and service devices (not illustrated) and thrusters 511. Based on the respective primary energy source, each thruster 511 may be broadly categorized as either "chemical" or "electric".

Chemical thrusters, whether the propellant is solid or liquid, monopropellant or bipropellant, deliver thrust by converting chemical energy stored in the propellant to kinetic energy delivered to combustion products of the chemical propellant. Chemical thrusters, as the term is used herein, and in the claims, also include electrothermal thrusters such as arc-jets that are configured to use electrical energy to increase the temperature, and, therefore, the velocity of the combustion products of chemical propellants.

In contrast, an electric thruster, as the term is used herein, and in the claims, converts electrical energy to propellant kinetic energy substantially without regard to any chemical energy the propellant may possess. For example, an electric thruster may operate by ionizing and accelerating a gaseous propellant, where the propellant is a heavy noble gas such as xenon or argon. Irrespective of the selected propellant, a negligible amount of thrust results from energy chemically stored in the propellant. The term electric thruster, as used herein and in the claims, encompasses an electrostatic thruster, an electromagnetic thruster, a Hall Effect thruster, a wakefield accelerator, and a traveling wave accelerator, for example.

Referring still to FIG. 5, spacecraft controller 520 may include or be included in a spacecraft attitude and orbit control subsystem. In the illustrated example, spacecraft controller 520 is communicatively coupled with propulsion subsystem 510 and may be configured to control the operation of propulsion subsystem 510, including thrusters 511.

Spacecraft controller 520 may be configured to execute an orbit transfer maneuver by causing the propulsion subsystem to perform one or more operations. Each operation may include either or both of a chemical thruster firing and an electric thruster firing. The orbit transfer maneuver may include two or more thruster firings, each performed proximate to orbit perigee, separated by a respective intervening coast period.

Referring still to FIG. 5, spacecraft 500 may also include one or more star trackers 534 and/or inertial sensors 536. Inertial sensor 536 may include a digital integrating rate assembly (DIRA) or the like. In an embodiment, determination of spacecraft inertial attitude may be performed by spacecraft controller 520 using the output of star tracker 534 and/or inertial sensor 536. Determination of spacecraft inertial attitude may be performed using only the output of the star tracker 534 and/or inertial sensor 536.

Figure 6:
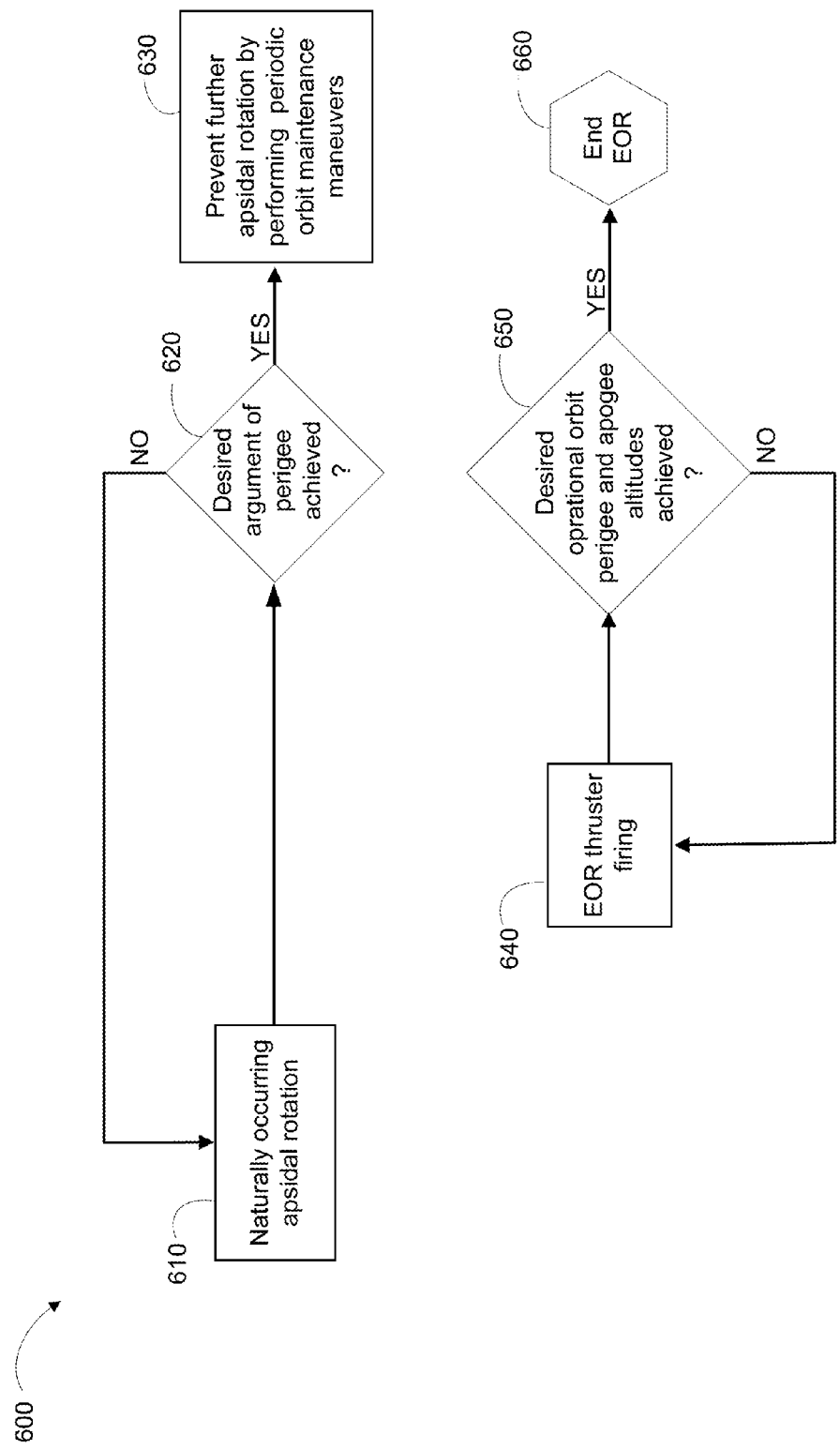
FIG. 6 illustrates a method of HIEO acquisition according to some implementations.

Referring now to FIG. 6, a method 600 of placing at least one satellite into an operational orbit will be described. As indicated above, the method may be implemented where the satellite has been first disposed in a launch vehicle deployment orbit having an argument of perigee of 0 (360) degrees (Orbit 1 of FIG. 1) or in a launch vehicle deployment orbit having an argument of perigee of 180 degrees (Orbit 4 of FIG. 3). The launch vehicle deployment orbit may have a perigee altitude of approximately 500 km and an apogee altitude of approximately 14,000 km and may have an inclination approximately the same as the desired operational orbit.

The method 600 includes parallel processes of (i) allowing a natural apsidal rotation to result in the argument of perigee rotating approximately 90° and (ii) performing electric orbit-raising whereby the operational orbit apogee altitude and perigee altitude are achieved. As described above in connection with FIG. 2, in some implementations it is desirable that at least some of the natural apsidal rotation and performance of electric orbit-raising occur concurrently. In some implementations, the desired argument of perigee is achieved at approximately the same time as the operational orbit apogee altitude and perigee altitude are achieved.

At block 610, naturally occurring apsidal rotation results in a 90° rotation of the argument of perigee. In the absence of a counteracting force, imparted for example by thrusters of the satellite propulsion subsystem, oblateness of the Earth will result in natural rotation of the argument of perigee at a rate such that the argument of perigee declines by approximately ⅔ of a degree per day.

At block 620, a determination may be made as to whether or not the desired argument of perigee has been achieved. If the determination at block 620 is that the desired argument of perigee has not been achieved, then the method returns to block 610. On the other hand, if the determination at block 620 is that the desired argument of perigee has been achieved then the method may proceed to block 630.

At block 630, further apsidal rotation may be prevented by performing periodic orbit maintenance or stationkeeping maneuvers so as to counteract the gravitational forces that would otherwise produce a natural apsidal rotation.

At block 640 electric orbit raising (EOR) thruster firings are carried out. As described above in connection with FIG. 2, in some implementations commencement of EOR thruster firings is timed such that desired operational orbit perigee and apogee altitudes are achieved at approximately the same time as the desired argument of perigee is achieved.

At block 650, a determination may be made as to whether or not the desired operational orbit perigee and apogee altitudes have been achieved. If the determination at block 650 is that the desired operational orbit perigee and apogee altitudes have not been achieved, then the method returns to block 640. On the other hand, if the determination at block 620 is that the desired operational orbit perigee and apogee altitudes have been achieved then the method may end EOR, block 630.

Thus, techniques for placing a satellite into a highly inclined elliptical orbit have been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A method of placing at least one satellite into an operational orbit, the method comprising:
   executing an orbit transfer strategy that transfers the satellite from a launch vehicle deployment orbit to the operational orbit, wherein:
   the operational orbit is substantially geosynchronous and has (i) an inclination of greater than 70 degrees; (ii) a nominal eccentricity in the range of 0.25 to 0.5; (iii) an argument of perigee of approximately 90 or approximately 270 degrees; (iv) an operational orbit apogee altitude of approximately 48,000 km; and (v) an operational orbit perigee altitude of approximately 23,000 km;
   the launch vehicle deployment orbit is substantially lower than the operational orbit and has an argument of perigee of approximately 90° greater than the argument of perigee of the operational orbit; and
   the orbit transfer strategy includes:
   an apsidal rotation of approximately 90° from the argument of perigee of the launch vehicle deployment orbit to the argument of perigee of the operational orbit, at least a substantial part of the apsidal rotation being attained without expenditure of any satellite propellant; and
   an orbit raising maneuver to attain the operational orbit apogee altitude and the operational orbit perigee altitude, at least a substantial part of the orbit raising maneuver being performed with electric thrusters.

2. The method of claim 1, wherein the at least one satellite includes two or more satellites, each of the two or more satellites being disposed, by a single launch vehicle, into the launch vehicle deployment orbit.

3. The method of claim 1, wherein the launch vehicle deployment orbit is reached by performing at least two orbit transfer maneuvers with an upper stage of a launch vehicle.

4. The method of claim 3, wherein the at least two orbit transfer maneuvers include a first maneuver that achieves an initial transfer orbit by firing a thruster of the upper stage proximate to the ascending node of an approximately circular parking orbit.

5. The method of claim 4, wherein the at least two orbit transfer maneuvers include a second maneuver that achieves the launch vehicle deployment orbit by firing a thruster of the upper stage proximate to the descending node of the initial transfer orbit.

6. The method of claim 4, wherein the parking orbit has an inclination of less than 72° and the launch vehicle deployment orbit has an inclination of approximately 90°.

7. The method of claim 1, wherein the launch vehicle deployment orbit has an apogee altitude that is greater than 12,000 km and less than 16,000 km.

8. The method of claim 1, wherein the launch vehicle deployment orbit has a perigee altitude that is greater than 300 km and less than 1000 km.

9. The method of claim 1, wherein the argument of perigee of the launch vehicle deployment orbit is 60° to 120° greater than the argument of perigee of the operational orbit.

10. A satellite comprising a propulsion subsystem and a spacecraft controller, the spacecraft controller configured to:
execute an orbit transfer strategy that transfers the satellite from a launch vehicle deployment orbit to the operational orbit, wherein:
the operational orbit is substantially geosynchronous and has (i) an inclination of greater than 75 degrees; (ii) a nominal eccentricity in the range of 0.25 to 0.5; (iii) an argument of perigee of approximately 90 degrees or approximately 270 degrees; (iv) an operational orbit apogee altitude of approximately 48,000 km; and (v) an operational orbit perigee altitude of approximately 23,000 km;
the launch vehicle deployment orbit is substantially lower than the operational orbit and has an argument of perigee of approximately 90° greater than the argument of perigee of the operational orbit; and
the orbit transfer strategy includes:
an apsidal rotation of approximately 90° such that the argument of perigee rotates from the argument of perigee of the launch vehicle deployment orbit to the argument of perigee of the operational orbit, at least a substantial part of the apsidal rotation being attained without expenditure of any satellite propellant; and
performing, with the propulsion subsystem, an orbit raising maneuver to attain the operational orbit apogee altitude and the operational orbit perigee altitude, at least a substantial part of the orbit raising maneuver being performed with electric thrusters.

11. The satellite of claim 10, wherein the at least one satellite includes two or more satellites, each of the two or more satellites being disposed, by a single launch vehicle, into the launch deployment orbit.

12. The satellite of claim 10, wherein the launch vehicle deployment orbit is reached by performing at least two orbit transfer maneuvers with an upper stage of a launch vehicle.

13. The satellite of claim 12, wherein the at least two orbit transfer maneuvers include a first maneuver that achieves an initial transfer orbit by firing a thruster of the upper stage proximate to the ascending node of an approximately circular parking orbit having a first inclination angle with respect to the equator.

14. The satellite of claim 13, wherein the at least two orbit transfer maneuvers include a second maneuver that achieves the launch vehicle deployment orbit by firing a thruster of the upper stage proximate to the descending node of the initial transfer orbit so as to attain a perigee altitude of approximately 500 km and to attain the operational orbit inclination.

15. The satellite of claim 12, wherein the at least two orbit transfer maneuvers include a first maneuver that achieves an initial transfer orbit by firing a thruster of the upper stage proximate to the descending node of an approximately circular parking orbit having a first inclination angle with respect to the equator.

16. The satellite of claim 15, wherein the at least two orbit transfer maneuvers include a second maneuver that achieves the launch vehicle deployment orbit by firing a thruster of the upper stage proximate to the ascending node of the initial transfer orbit so as to attain a perigee altitude of approximately 500 km and to attain the operational orbit inclination.

17. The satellite of claim 12, wherein the parking orbit has an inclination of less than 72° and the launch vehicle deployment orbit and the operational orbit have an inclination of approximately 90°.

18. The satellite of claim 10, wherein the apogee altitude of the operational orbit is greater than 43,000 km and less than 53,000 km.

19. The satellite of claim 10, wherein the perigee altitude of the operational orbit is greater than 18,000 km and less than 28,000 km.

20. The method of claim 19, wherein the argument of perigee of the launch vehicle deployment orbit is 60° to 120° greater than the argument of perigee of the operational orbit.

* * * * *